United States Patent Office 2,947,690
Patented Aug. 2, 1960

2,947,690
HEATING OF SEA WATER FOR SULFUR MINING

Bernard A. Axelrad, Freeport, Tex., assignor to Freeport Sulphur Company, New York, N.Y., a corporation of Delaware No Drawing. Filed July 19, 1956, Ser. No. 598,749

6 Claims. (Cl. 210—57)

This invention relates to improved processes for heating sea and other waters of high salinity in indirect or tubular heat exchangers to provide hot process water for use in sulfur mining. Such waters cannot be heated successfully in tubes by conventional heating procedures, for hard scale forms at a prohibitive rate when the temperature is raised to the high levels employed in such mining operations.

In my prior joint application with Vas Hubert Brogden, Serial No. 253,306, filed October 26, 1951 (Patent No. 2,756,035), we described a process directed at the problem of acomplishing this same result, involving first, adding an acidifying agent to the saline water which reduces the hydrogen ion concentration of the water to a pH value between about 6.5 and 7.5 and then heating the treated water under superamospheric pressure during passage through the tubes of a series of heat exchangers to a final temperature above about 250° F. while maintaining the temperature of the heating surfaces of the tubes in contact with the saline water below that which causes the calcium sulfate present in the saline water to precipitate out during the heating operation or attach as a hard scale on the heating surfaces.

In my prior application Serial No. 245,090, filed September 4, 1951 (Patent No. 2,756,207), of which the present application is a continuation-in-part, I described a process, also directed to the problem described above, involving the heating of saline waters by passing such water under superatmospheric pressure through a series of tubes in an indirect heat exchanger in which the saline water inside of the tubes is maintained at a temperature below that at which excessive hard scale deposition occurs and in which the saline water is heated under superatmospheric pressure to an ultimate temperature above 250° F. at which calcium sulfate would normally form a hard scale but below that at which calcium sulfate present in the altered saline water forms such scale, the result being that those salts which deposit in the tubes are composed substantially only of soft, non-adherent materials which can be flushed out periodically merely by forcing fluids rapidly through the tubes in which the deposition has occurred. In this application it is disclosed that the avoidance of deposition of scale can be facilitated further by the addition of sodium chloride or of concentrated salt dome to the saline water.

Whereas these prior processes have proven completely successful for the heating of saline waters available in certain areas, and for the mining of sulfur under limited conditions, it has since become apparent that an improved process is needed which has greater flexibility in connection with the mining of sulfur and is capable of operating under other conditions, including the use of saline or sea waters of higher salinity.

Improvement through the addition of sodium chloride has limitations of economic character and as to the addition of raw salt dome brine, there is a limit upon the benefit obtainable, since the amount that can be added to the sea water is limited due to the resulting excessive increase in specific gravity imparted to the process water, in relation to successful use in sulfur mining.

The objects of the present invention include the provision of processes capable of providing saline waters at higher sulfur mining temperatures and capable of utilizing waters of higher salinity, constituting improvements in the processes of the hereinbefore mentioned applications wherein saline water is heated to sulfur mining temperatures in tubes of indirect heat exchangers without causing excessive rates of calcium sulfate deposition.

In the preferred and most practical embodiment of the present invention, the sea or other high salinity water to be heated in a continuously flowing stream is supplemented by the addition of a small proportion, e.g. 0.1–10% of a concentrated salt dome brine the calcium sulfate content of which has been substantially reduced and is low in relation to saturation, or, e.g. below about 2000 mg./l. calcium, calculated as $CaCO_3$. The sea water containing the brine is thereafter treated by the addition of an acidifying agent as sulfuric acid, in a quantity which increases the hydrogen ion concentration to a pH value of about 6.5–7.5 and the treated water is then forced under superatmospheric pressure into and through a series of heating tubes of a heat exchanger in which the heating surfaces of the tubes in contact with the treated saline water are maintained below that which causes appreciable precipitation of the calcium sulfate present in the water.

Because of the addition of the salt dome brine of low calcium sulfate content to the sea water, the temperature to which the sea water can be heated for providing sulfur mining process water and without causing scaling is substantially increased, and depending upon how high the salt content of the sea water treated is, process water at temperatures of from 280°–360° F. can be provided without causing scaling difficulties in the heaters.

The concentrated brine may be obtained from the salt dome by conventional procedures, using any available source of water which normally would be of the same origin as the sea or other saline water used for the mining process. Saturated brine is preferably employed for reasons of efficiency, but brines of only twenty percent NaCl or less can be used to advantage. For the mining of sulfur by conventional procedures, the amount of the brine added to the sea or other saline water and its sodium chloride content should be such as will not produce process water of too great a specific gravity, that is one having more than about 5% NaCl.

More in detail, the concentrated salt dome brine of excessive calcium sulfate content in relation to saturation is treated to take out the excessive calcium content by reacting the calcium sulfate to be removed with sodium carbonate or soda ash, and settling or filtering to remove the calcium carbonate precipitate formed. This treatment, suitably, can remove as much as 85% of the calcium, but it may be advisable for reasons of economy, in relation to equipment available or other factors, to remove a lesser amount, or as low as 20% of the calcium.

In a limited alternative or supplementary concept, the present invention contemplates lessening the quantity of calcium sulfate in relation to that of the sodium chloride present in the salt or other saline water being converted into hot process water for sulfur mining, by reducing the actual quantity of calcium sulfate in the said sea water. This reduction in calcium sulfate content may be effected by treatment of the sea water with sodium carbonate, or less satisfactorily, with magnesium carbonate or with a sodium ion exchange material either of the resin type of the zeolite type, each of which procedures converts the dissolved calcium sulfate into a soluble sulfate and an insoluble calcium compound which is removed from the treated water, as by settling or filtering action. Under this method of procedure it is ordinarily sufficient if some 5% to 10% of the calcium sulfate in the sea water is removed.

The invention may be utilized for heating any natural waters of high salinity wherein deposition of calcium sulfate in tubes of indirect heat exchangers is a problem. Such saline waters include sea water, bay water, tidal water and sometimes also marsh water, river water and other like natural waters and the invention is applicable more particularly to such waters containing more than about 3% sodium chloride. In the treatment of such waters of relatively low salinity, higher ultimate temperatures may be accomplished without such scale deposition occurring, or waters of relatively higher salinity may be heated to less high ultimate temperatures without such deposition. All of these saline waters contain scale-forming salts including calcium sulfate in proportion to the salinity of the water. Tests conducted in connection with such waters indicate that their hydrogen ion concentrations vary between 7.7 and 8.3 in pH value.

The acidification of the saline water can be accomplished in the practice of the present invention in the same manner as it is effected in the invention covered in the hereinbefore mentioned application. It may be carried out merely by adding an acidifying agent, either an acid or an acid-forming compound to the saline water at any time before it is heated in the tubes wherein hard scale depositon must be prevented. Small amounts of mineral acids, as hydrochloric or sulfuric, or of acid-forming compositions as sulfur dioxide and carbon dioxide, can be satisfactorily used.

Although the addition of any amount of acid is theoretically of some benefit the amount required for practical advantage should reduce the pH value to 7.5 or below but preferably not below 6.5 where corrosion difficulties may be encountered. With relatively high salinity water it is preferable that the amount of acid reduce the pH value to 6.7 or below.

The addition of acid may be effected simply by introducing a small stream of the same in a predetermined proportion to the stream of saline water immediately before it is forced by means of a high pressure pump into and through the tubes of the indirect heat exchanger.

The heating operation may be carried out in accordance with any of the procedures described in the hereinbefore mentioned application. As described therein the treated saline water is initially preheated in a packed tower or other suitable equipment by direct contact with flue gases from the boilers providing the steam for the indirect heat exchanger employed in the final step of the heating process of the invention. The heating with these gases may be used to advantage to heat the water to about 110° to 140° F. The thus heated water is then further heated in a second stage by combustion gases from auxiliary burners operating in the lower section of the same tower or in a separate tower or heat exchanger.

The preliminary direct heating is preferably carried out in a tower at atmospheric pressure in which the saline water is introduced at least in part at the top from which it flows downwardly over any suitable packing in contact with upwardly flowing combustion gases. During this heating the diatoms, silt and other colloidal matter are coagulated and settled out in any suitable manner and preferably in a pool formed in the bottom of the heating tower from which pool the water is decanted and the settled sludge periodically blown out.

For carrying out the main heating operation of the invention the preliminary heated and purified saline water of adjusted hydrogen ion concentration is passed through a high pressure pump into the tubes of the indirect heat exchanger, the magnitude of the superatmospheric pressure applied to the water being sufficient to provide a pressure in the exchanger outlet greater than the vapor pressure of the dissolved gases. The initial pressure applied varies with the ultimate temperature, the particular construction of the exchanger and other minor factors. Pressures of 250 to 350 p.s.i. are suitable minimum pressures primarily contemplated. In the instant process heating of the salt water in the indirect heat exchanger is controlled in such manner that the skin temperature or temperatures of the heating surface with which the water comes in contact are always below the temperature predetermined to cause hard scale formation from water of the specific salinity treated during the period the water remains in the tubes.

The present invention contemplates several additional alternative procedures which may be used to advantage under specific conditions, as follows:

A. Only part of the sea water (e.g., one-half) is treated for the removal of calcium and this part is mixed with the remaining part of the raw or untreated sea water to provide a mixture capable of heating without involving the hard scale deposition. This procedure will require more complete removal of the calcium content of the treated part to obtain comparable ultimate results.

B. The sea water or a part thereof is treated to remove a very substantial part of its calcium content and this treated water, or mixture of treated water and untreated water, is supplemented by an addition of untreated salt dome brine to increase the sodium chloride content of the ultimate water to be heated.

C. Both the sea water, or a part thereof, and the brine are treated to remove calcium, in which case, the proportion of the calcium removed from each may be relatively smaller.

*Example 1*

A sulfur mining plant has available, as mine or process water, sea water containing 3.1% salt and calcium salts the content of which is measured as 1,050 mg./l. of calcium (expressed as $CaCO_3$). This water is drawn through a 1-mesh screen by pumps and is transferred into a reservoir where it settles for several days.

A portion of this water is drawn from the reservoir by a pump which forces it down a brine well, sunk into the underlying salt dome, allowing it to dissolve salt and then be returned to the surface through the annular pipe of the brine well. The brine obtained from this brine well contains 24% salt and 2,000 mg./l. of calcium (expressed as $CaCO_3$).

The calcium content of this brine is reduced to 1,325 mg./l. of calcium (expressed as $CaCO_3$) by treating each thousand gallons of it with 6 lbs. of sodium carbonate in equipment which allows about 3 hours of quiet retention, in which the calcium carbonate that is precipitated settles out, and from which the clarified brine is withdrawn by a pump.

The major portion of the sea water used for sulfur mining is separately and simultaneously drawn from the reservoir by a pump, and the brine, obtained and treated as above described, is mixed with it in the proportion of 1 volume of brine to every 10 volumes of sea water. This mixture of sea water and brine is then treated by the general process of the prior application Serial No. 253,306 (Patent No. 2,756,035). The mixture enters the top of the direct-contact heating tower where it is first contacted, and heated to about 140° F., by rising hot gases derived from the plant boiler furnaces. After passing about halfway down the tower, the water leaves the section through which the boiler furnace gases are rising and enters the lower section of the tower where it is contacted, and heated to about 180° F., by rising hot, oxygen-free gases derived from fuel burners located near the bottom of the tower. Contact with these hot gases, besides raising the temperature, removes oxygen from the water and dissolves carbon dioxide into it, causing its pH to be lowered into the range of 6.5 to 7.0.

The heated water finally flows to the bottom of the tower, where any suspended matter settles out, and from which it is withdrawn, through a cone, by a pump.

This pump forces the water through a two-stage tubular heat exchanger, the first stage of which is supplied with a low pressure steam of about 75 p.s.i., and the second stage of which is supplied with a high pressure steam of about 100 p.s.i., where it is heated to the temperature of 320° F.

From the heat exchangers, the heated mine water flows through insulated surface lines to the various sulfur wells.

In this example, the addition of brine, treated as described, to the sea water inhibits deposition of calcium sulphate scale during and after heating in the heat exchangers to 320° F. Without treatment of the brine, a considerably higher proportion of brine to sea water would have been necessary to inhibit calcium sulphate scale, and the density of the resulting mine water would have consequently been too great for use in conventional manner in sulfur mining.

*Example 2*

A sulfur mining plant has available, as mine or process water, sea water containing 3.1% salt and 1.050 mg./l of calcium (expressed as $CaCO_3$). This water is screened, settled, treated and heated in accordance with Example 1 with the following differences: The brine obtained from the salt dome contains 24% salt and 1200 mg./l. of calcium (expressed as $CaCO_3$).

The major portion of the sea water used for sulfur mining is separately and simultaneously drawn from the reservoir by a pump. Half of this sea water is directed through a bed of sodium-ion exchange resin which reduces its calcium content to 745 mg./l. (expressed as $CaCO_3$). The other half of this sea water undergoes no treatment.

The untreated sea water, the treated sea water and the brine are then mixed in the following proportions:

5 volumes untreated sea water, containing 1,050 mg./l. of calcium (expressed as $CaCO_3$);
5 volumes of treated sea water, containing 745 mg./l. of calcium (expressed as $CaCO_3$);
1 volume of brine, containing 1,200 mg./l. of calcium (expressed as $CaCO_3$).

This mixture is then preliminarily heated in the direct contact heating tower to a temperature of about 190° F. and due to carbon dioxide taken up therein the pH value is lowered into the range of 6.5 to 7.

The partially heated water is then heated in the two stage tubular heat exchanger, the first stage of which is supplied with a low pressure steam of about 75 p.s.i. and the second stage with a high pressure steam of about 125 p.s.i. where the water is heated to a final temperature of 360° F.

The admixing of the brine with the sea water, and the partial treatment of a portion of the sea water, allows heating of the mixture to a temperature of 360° F. without causing deposition of calcium sulphate scale. If a portion of the sea water had not been partially treated, deposition of calcium sulphate scale would have occurred when the water temperature exceeded 320° F.

*Example 3*

On a per diem basis, a stream of 121,000 gallons of salt dome brine of 24.0% sodium chloride content and 3000 mg./l. calcium content, as calcium carbonate, is mixed with a stream of 2,800,000 gallons of sea water having a salinity of 25,000 mg./l. sodium chloride thereby increasing the salinity to 3.6% sodium chloride, and the hydrogen ion concentration of the resulting mixture is increased to a pH value of 6.7 following which the treated mixture is heated to 320° F. by passage through a series of tubes of indirect heat exchangers, the heating surfaces of said tubes in contact with the said water being maintained at a temperature below that which causes calcium sulfate scale to form thereon.

*Example 4*

For providing hot process water at 330° F. using the sea water of the salinity disclosed in Example 3, such water in the same quantity was mixed with 154,000 gallons of brine, the sodium chloride content of the resulting sea water-brine mixture being 4.0%.

*Example 5*

Sea water having a salinity of 31,000 mg./l. NaCl can be successfully heated to 320° F. in the process of Example 3 by adding 196,000 gallons per day of salt dome brine of 24.0% sodium chloride concentration, the calcium carbonate content of which has been reduced from 3000 to 1,350 mg./l. calcium by the action of 1,180 pounds of soda ash in conventional water treating equipment wherein the calcium carbonate formed is separated. This amount of brine produces an altered sea water having 5.0% sodium chloride.

*Example 6*

Sea water having a salinity of 31,000 mg./l. NaCl used in the foregoing example can be heated to 330° F. in the tubes of the indirect heat exchanger provided there is added 196,000 gallons per day of brine containing 24.0% NaCl the calcium content of which has been reduced to 350 mg./l. as calcium carbonate, which reduction may be obtained by treating the brine in conventional water heating equipment with 2,700 pounds of soda ash.

*Example 7*

A sea water containing 25,000 mg./l. sodium chloride is treated with 3,500 pounds of soda ash for each 2,800,000 gallons of said water. Through this treatment the calcium content of the sea water is reduced to 750 mg./l. as calcium carbonate. Thereupon the resulting mixture is treated with acid and heated to 320° F. in accordance with the procedure of Example 3.

*Example 8*

As in the foregoing example, the same sea water is treated with 3,900 pounds of soda ash which reduces the calcium content to 735 mg./l. as calcium carbonate. The resulting treated water can be heated in the tubes of the indirect heat exchanger to 330° F. without causing deposition of excessive calcium carbonate scale.

*Example 9*

For heating sea water of 31,000 mg./l. NaCl to 320° F., it is treated with approximately 9,600 pounds of soda ash for each 2,800,000 gallons of water, which treatment reduces the calcium content to 740 mg./l. as calcium carbonate.

*Example 10*

The temperature of the sea water of salinity used in the preceding example can be raised to 330° F. if the water is treated with 9,900 pounds of soda ash per 2,800,000 gallons of sea water, which addition serves to reduce the calcium content to 730 mg./l. as calcium carbonate.

Where removal of calcium sulfate is specified in the claims, this step includes decomposition of the calcium sulfate followed by removal of the calcium thereof whether the sulfate is removed or not.

It should be understood that the invention is not limited to the specific details herein given but that it extends to all procedures and conditions of operation which will occur to those skilled in the art upon consideration of the scope of the claims appended hereto.

I claim:

1. A process for superheating sea water and other waters of high salinity to sulfur mining high temperatures in tubes of indirect heat exchangers without causing substantial scale deposition on the heating surfaces of the tubes which comprises, pumping sea water down into and out of a salt dome thereby producing a concentrated brine, removing at least 20% of the calcium sulfate content by reacting the same with sodium carbonate and separating the calcium carbonate precipitate formed, mixing the resulting brine in a proportion of 0.1 to 10% with sea water, increasing the hydrogen ion concentration of the resulting water-brine mixture to a pH value of about 6.5–7.5, forcing the mixed waters under superatmospheric pressure into and through the tubes of the heat exchanger, heating the same in said tubes to a temperature at which scale deposition would occur if it were the raw saline water initially used, and maintaining the temperature of the heating surfaces of the tubes in contact with the altered saline water below that which causes precipitation of the calcium sulfate present in said water.

2. In the heating of sea and other high salinity waters to scale-forming high temperatures involving forcing the water under superatmospheric pressure through tubes of indirect heat exchangers, the improvement which comprises, preventing deposition of scale on the heat transferring surfaces of said tubes by the combination of steps involving, removing from 20–85% of the calcium sulfate content of a concentrated salt dome brine, adding the resulting altered brine to the saline water to be heated, increasing the hydrogen ion concentration of the resulting water having a sodium chloride content not in excess of about five percent to a pH value of about 6.5–7.5, and maintaining the temperature of the heating surfaces of the tubes in contact with the saline water below that which causes the calcium sulfate present to precipitate out during the heating operation.

3. In the heating of sea and other high salinity waters to scale-forming high temperatures involving forcing the water under superatmospheric pressure through tubes of indirect heat exchangers, the improvement which comprises, preventing deposition of scale on the heat transferring surfaces of said tubes by the combination of steps involving, removing from 20–85% of the calcium sulfate content of a concentrated salt dome brine, adding the resulting altered brine in a proportion of about 0.1–10% to the saline water to be heated, increasing the hydrogen ion concentration of the resulting water to a pH value of about 6.5–7.5, and maintaining the temperature of the heating surfaces of the tubes in contact with the saline water below that which causes the calcium sulfate present to precipitate out during the heating operation.

4. In the heating of sea and other high salinity waters to scale-forming high temperatures involving forcing the water under superatmospheric pressure through tubes of indirect heat exchangers, the improvement which comprises, preventing deposition of scale on the heat transferring surfaces of said tubes by the combination of steps involving, adding to said saline water a concentrated salt dome brine containing below about 2000 mg./l. of calcium sulfate, increasing the hydrogen ion concentration of the resulting water having a sodium chloride content not in excess of about five percent to a pH value of about 6.5–7.5, and maintaining the temperature of the heating surfaces of the tubes in contact with the saline water below that which causes the calcium sulfate present to precipitate out during the heating operation.

5. In the heating of sea and other high salinity waters to scale-forming high temperatures involving forcing the water under superatmospheric pressure through tubes of indirect heat exchangers, the improvement which comprises, preventing deposition of scale on the heat transferring surfaces of said tubes by the combination of steps involving, adding to said saline water a concentrated salt dome brine in a proportion of about 0.1–10%, said brine containing below about 2000 mg./l. of calcium sulfate, increasing the hydrogen ion concentration of the resulting water to a pH value of about 6.5–7.5, and maintaining the temperature of the heating surfaces of the tubes in contact with the saline water below that which causes the calcium sulfate present to precipitate out during the heating operation.

6. In the heating of sea and other high salinity waters to scale-forming high temperatures involving forcing the water under superatmospheric pressure through tubes of indirect heat exchangers, the improvement which comprises, preventing deposition of scale on the heat transferring surfaces of said tubes by the combination of steps involving, removing at least 20% of the calcium sulfate content from a concentrated salt dome brine containing from about 20–24% sodium chloride, adding the resulting altered brine in a proportion of about 0.1–10% to the saline water to be heated, increasing the hydrogen ion concentration of the resulting water having a sodium chloride content not in excess of about five percent to a pH value of about 6.5–7.5, and maintaining the temperature of the heating surfaces of the tubes in contact with the saline water below that which causes the calcium sulfate present to precipitate out during the heating operation.

References Cited in the file of this patent

UNITED STATES PATENTS

| | | |
|---|---|---|
| 2,756,035 | Axelrad et al. | July 24, 1956 |
| 2,756,207 | Axelrad | July 24, 1956 |
| 2,756,708 | Axelrad et al. | July 24, 1956 |

OTHER REFERENCES

Christie: "Boiler Waters," New York, Van Nostrand, 1906, pp. 7–9.

Mellor: A Comprehensive Treatise on Inorganic and Theoretical Chemistry, vol. III, London, Longmans, 1923, pp. 785 and 786.

ASTM Manual on Industrial Water, publication No. 148, 1953, p. 40.